United States Patent [19]

Teramachi

[11] Patent Number: 4,515,416
[45] Date of Patent: May 7, 1985

[54] LINEAR SLIDE BEARING

[76] Inventor: Hiroshi Teramachi, 2-34-8, Higashi-Tamagawa, Setagava-Ku, Tokyo, Japan

[21] Appl. No.: 609,139

[22] Filed: May 11, 1984

[30] Foreign Application Priority Data

May 13, 1983 [JP] Japan .................... 58-83828

[51] Int. Cl.$^3$ ............................ F16C 29/06
[52] U.S. Cl. .................................... 308/6 C
[58] Field of Search ............. 308/3 R, 3 A, 6 R, 6 A, 308/6 B, 6 C

[56] References Cited

U.S. PATENT DOCUMENTS

| | | | |
|---|---|---|---|
| 3,436,132 | 4/1969 | Wiesler | 308/6 C |
| 4,253,709 | 3/1981 | Teramachi | 308/6 C |
| 4,296,974 | 10/1981 | Teramachi | 308/6 C |
| 4,390,215 | 6/1983 | Mottate | 308/6 C |

Primary Examiner—John Petrakes
Assistant Examiner—David Werner
Attorney, Agent, or Firm—Kenyon & Kenyon

[57] ABSTRACT

A linear slide bearing is disclosed which includes a main body of channel-like cross-section having a ceiling portion and a pair of skirt portions defining a central cavity therebetween, each skirt portion being provided in its inner surface with a race-receiving groove of semi-circular cross-section opening to the central cavity. The race-receiving groove has a stopper projected at its lower arcuate end. Each skirt portion further has a non-loaded ball passage longitudinally formed therethrough. Mounted in each race-receiving groove formed in the main body are a pair of right and left bearing races each constituted by an arcuate member of semi-circular cross-section. The arcuate member is provided in the center of its inner surface with a loaded ball groove having a center of curvature coincident with that of the race-receiving groove. A race-pressing member in the form of a wedge member is adjustably screwed to the inner surface of the ceiling portion of the main body, the race-pressing member being adapted to press the bearing races toward the stoppers with its wedge surfaces being simultaneously placed into abutting engagement with one side surfaces of the bearing races.

5 Claims, 21 Drawing Figures

LINEAR SLIDE BEARING

BACKGROUND OF THE INVENTION

The present invention relates to a linear slide bearing suitable for use in various sliding parts such as the table saddle of a machine tool, the slider of a machining center, and the slider of a transportation robot for reciprocative transportation of a heavy object.

Figure 21:
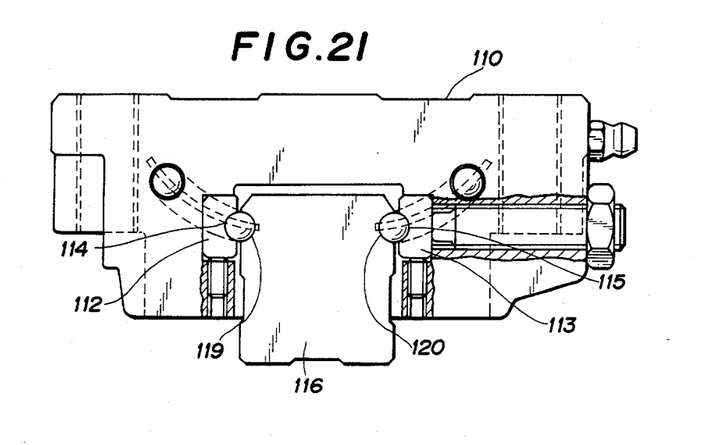
FIG. 21 is a front elevational view of a conventional linear slide bearing.

In a typical conventional linear slide bearing, a pair of left and right bearing races 112, 113 are individually fixed as shown in FIG. 21, for example. In consequence, the number of processes required for mounting the bearing races is increased as compared with a bearing of the type in which a pair of left and right bearing races are simultaneously fixed, to make the mounting operation troublesome. In addition, since it is difficult to effect adjustment so that both the bearing races 112, 113 are fixed in a balanced state, the contact pressures between balls and the bearing races are apt to be nonuniform, which constitutes a main cause to prevent a smooth recirculation of the balls, disadvantageously. Further, in the prior art, the pair of left and right bearing races 112, 113 are fixed to a main body 110 of the linear slide bearing by means of screws. Therefore, when the bearing races must be fixed to the main body at many points, it is troublesome to conduct the fixing operation, inconveniently. Moreover, when the bearing races are fixed by means of screws, it is difficult to adjust the screw tightening force; hence, it is impossible to properly locate and mount the bearing races 112, 113 so as to correctly position, particularly, the curvature centers of ball rolling surfaces 114, 115 formed on the bearing races 112, 113, respectively, or obtain the verticalness of the bearing races 112, 113. In consequence, the contact pressures of the balls, which are interposed between the ball rolling surfaces 114, 115 on the bearing races 112, 113 and ball rolling surfaces 119, 120 formed on a track shaft 116, become nonuniform to make it impossible to effect a smooth recirculation of the balls, as well as cause the ball rolling surfaces 114, 115, 119, 120 to be unevenly worn, unfavorably. Furthermore, in the conventional linear slide bearing, each of the bearing races 112, 113 is made of a flat plate member and therefore easily twisted when a load is applied thereto. As a result, it becomes impossible to maintain parallelism between the ball rolling surfaces 114, 115 on the bearing races 112, 113 and the ball rolling surfaces 119, 120 on the track shaft 116, so that the contact pressures of the balls become nonuniform, disadvantageously.

SUMMARY OF THE INVENTION

Under these circumstances, the invention aims as its primary object at overcoming the above-described problems of the prior art.

Accordingly, it is an object of the invention to provide a linear slide bearing in which bearing races of semi-circular cross-section retained at both ends thereof by end covers are simultaneously pressed by a single race-pressing member to allow the bearing races to be simultaneously fixed thereby to simplify the operation for mounting the bearing races and attain a smooth recirculation of the balls through an improvement in the mounting accuracy.

It is another object of the invention to provide a linear slide bearing in which each of the bearing races is made of an arcuate member having a semi-circular cross-section to exhibit a sufficiently large resistance to twisting force thereby to ensure a smooth recirculation of the balls.

To these ends, according to the invention, there is provided a linear slide bearing comprising: a main body of channel-like cross-section having a ceiling portion and a pair of skirt portions defining a central cavity therebetween, each skirt portion being provided in its inner surface with a race-receiving groove of semi-circular cross-section opening to the central cavity, the race-receiving groove having a stopper projected at its lower arcuate end, each skirt portion further having a non-loaded ball passage longitudinally formed therethrough; a pair of right and left bearing races each in the form of an arcuate member of semi-circular cross-section mounted in each of the race-receiving grooves in the main body, the arcuate member being provided in the center of its inner surface with a loaded ball groove having a center of curvature coincident with that of the race-receiving groove; a race-pressing member in the form of a wedge member adjustably screwed to the inner surface of the main body ceiling portion, the race-pressing member having wedge surfaces adapted to be simultaneously placed into abutting engagement with one side surfaces of the bearing races for pressing the bearing races toward the stoppers; a track shaft adapted to be fitted in the central cavity in the main body and provided on its right and left side surfaces with loaded ball grooves each having a center of curvature coincident with that of the corresponding one of the bearing races; a pair of front and rear end covers secured to the front and rear end surfaces of the main body, each cover having race retainer grooves for supporting one ends of the bearing races and being provided in its inner surfaces with ball turning grooves for connection between loaded ball passages, which are defined by the loaded ball grooves in the bearing races and in the track shaft, and the non-loaded ball passages, which are formed in the main body; and balls adapted to recirculate through the loaded ball passages and non-loaded ball passages connected with each other.

These and other objects, features and advantages of the invention will become clear from the following description of the preferred embodiment thereof taken in conjunction with the accompanying drawings.

BRIEF DESCRIPTION OF THE DRAWINGS

FIGS. 1 to 20 in combination show an embodiment of the linear slide bearing in accordance with the present invention, in which:

DESCRIPTION OF THE PREFERRED EMBODIMENT

A preferred embodiment will be described hereinunder with reference to the accompanying drawings.

A linear slide bearing in accordance with the invention has a main body generally designated at a reference numeral 1. The main body 1 is an integral member of channel-like cross-section constituted by a ceiling portion 2 and left and right skirt portions 4, 5 defining a central cavity 3 therebetween.

Figure 1:
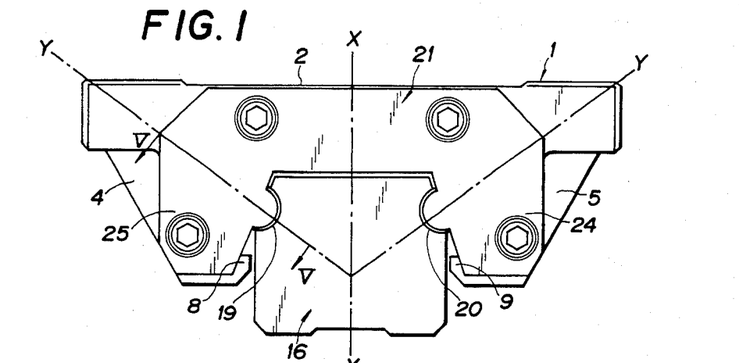
FIG. 1 is a front elevational view of the linear slide bearing.
Figure 2:
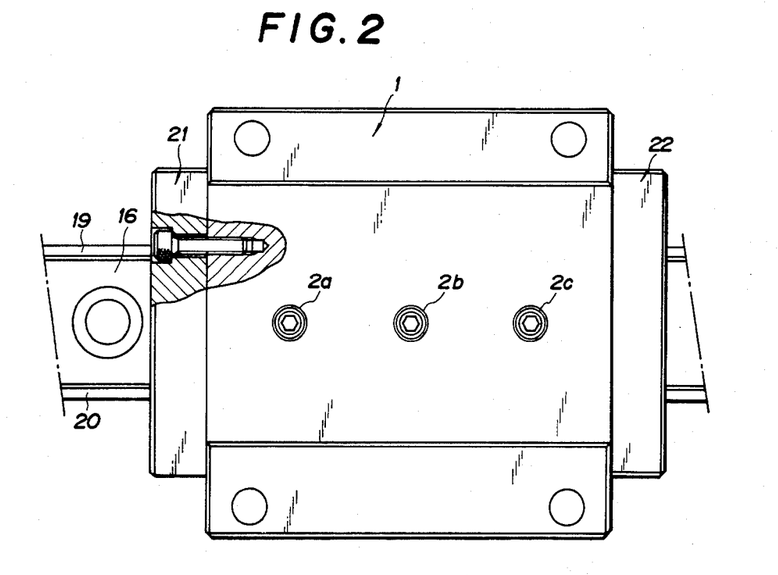
FIG. 2 is a plan view of the linear slide bearing.
Figure 3:
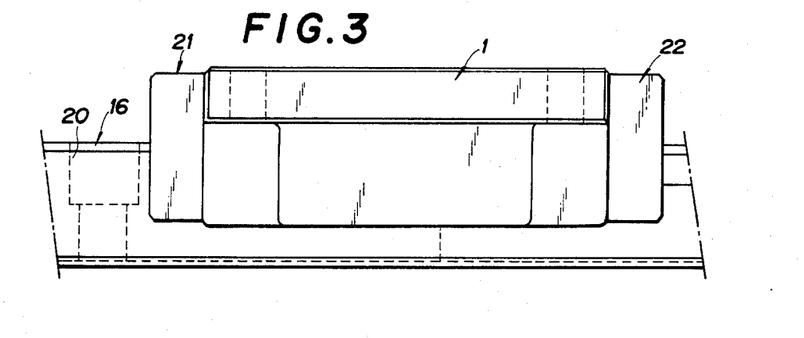
FIG. 3 is a side elevational view of the linear slide bearing.
Figure 4:
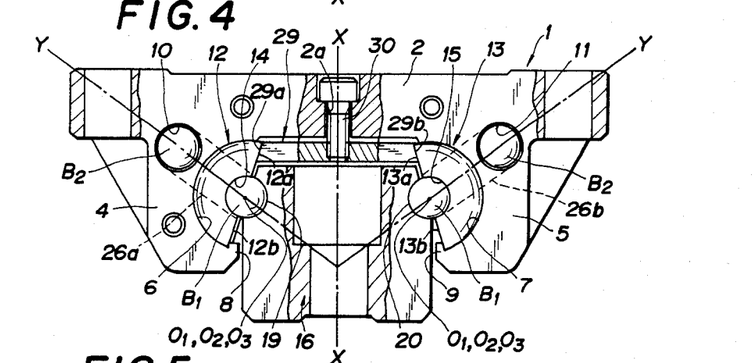
FIG. 4 is a front elevational view of the linear slide bearing with one of the end covers thereof removed.
Figure 5:
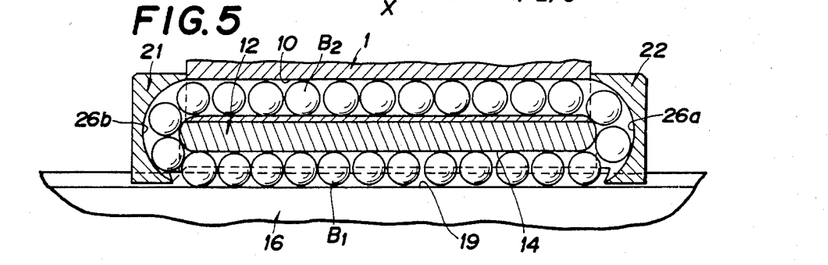
FIG. 5 is an obliquely cut sectional view taken along the line V—V of FIG. 1.
Figure 6:
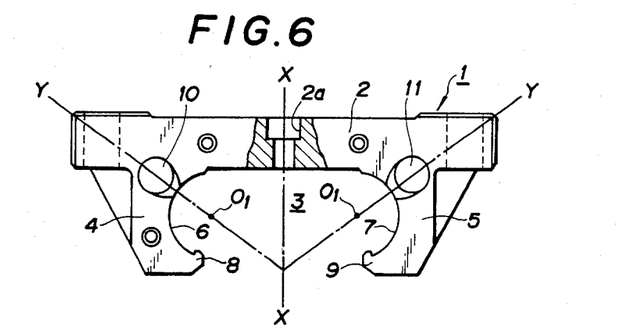
FIG. 6 is a front elevational view of a bearing main body.
Figure 7:
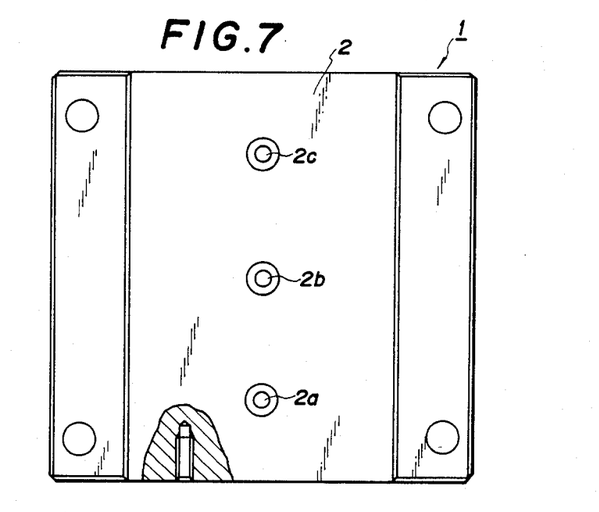
FIG. 7 is a plan view of the main body.
Figure 8:
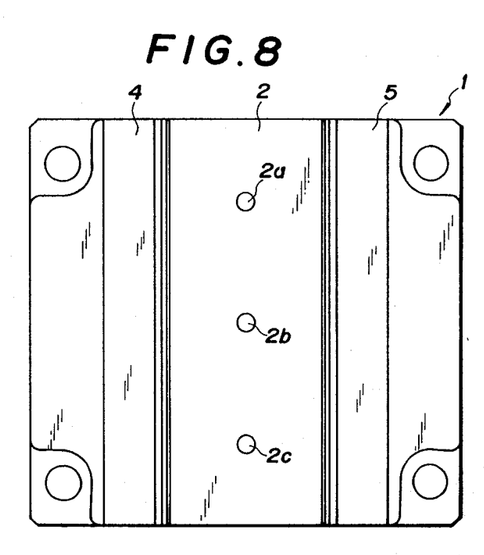
FIG. 8 is a bottom view of the main body.
Figure 9:
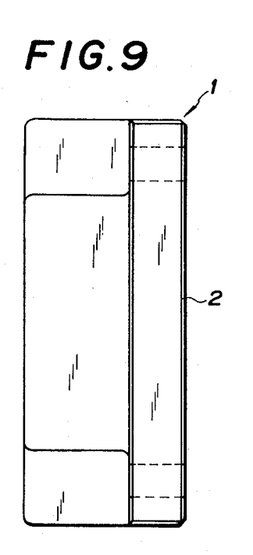
FIG. 9 is a side elevational view of the main body.

Reference numerals 6, 7 denote left and right race-receiving grooves of semi-circular cross-section which are formed in the opposing surfaces of the skirt portions 4, 5 in symmetry with each other with respect to the longitudinal axis of the main body 1 so as to open to the central cavity 3. There are provided stoppers 8, 9 projecting so as to cross the openings of the race-receiving grooves 6, 7, at bottom ends of the arcuate grooves constituting the race-receiving grooves 6, 7, that is, the lower ends of the arcuate grooves remoter from the ceiling portion 2, respectively. It is to be noted that a symbol $O_1$ denotes the curvature center of each of the race-receiving grooves 6, 7. Reference numerals 10, 11 represent non-loaded ball passages of circular cross-section bored in the solid portions of the skirt portions 4, 5, respectively. Each non-loaded ball passage is substantially equal in curvature to balls and has a diameter larger than the ball diameter. The non-loaded ball passages are axially provided over the entire length of the main body 1. Thus, as shown in FIGS. 4 and 6, the non-loaded ball passages 10, 11 are located on intersection lines Y—Y, respectively, each crossing the central line X—X of the main body 1 at an angle of about 55°. It is to be noted that reference numerals 2a, 2b, 2c in the Figures represent screw fitting holes bored at predetermined spacings along the longitudinal center of the ceiling portion 2 of the main body 1.

The main body 1, having the above-described construction, is formed from a light-weight material such as a synthetic resin. The light-weight main body 1 effectively decreases the inertia and, therefore, can suitably used for the linear slide bearing which is required to move at a high speed through repetitional start and stop.

A pair of left and right bearing races 12, 13, each being an arcuate member having a semi-circular cross-section, are adapted to be received in the race-receiving grooves 6 and 7 formed in the main body 1. As specifically shown in FIGS. 4, 10 and 11, loaded ball grooves 14, 15, each having a semi-circular cross-section, are formed in the inner peripheral surfaces of the bearing races 12, 13 so as to extend in the axial direction of the main body 1 correspondingly to the non-loaded ball passages 10, 11 bored in the main body 1. The curvature center $O_2$ of each loaded ball groove is coincident with the curvature center $O_1$ of the corresponding race-receiving groove. Thus, the loaded ball grooves 14, 15 are disposed in symmetry with respect to the axis of the main body 1, on the intersection lines Y—Y each crossing the central line X—X of the main body 1 at an angle of about 55°. In addition, balls $B_1$ under the load contact the surfaces of the corresponding loaded ball grooves 14, 15 at a contact angle $\beta$ which is selected to be 45°. Consequently, the area of contact between the surface of each ball and the surface of the associated loaded ball groove, afforded by elastic deformation of the ball and the groove, is increased to reduce the level of the load born by the unit area of the contact region thereby to increase the load bearing capacity of the linear slide bearing as a whole.

Figure 10:
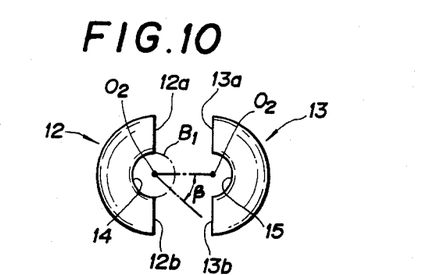
FIG. 10 is a front elevational view of bearing races.
Figure 11:
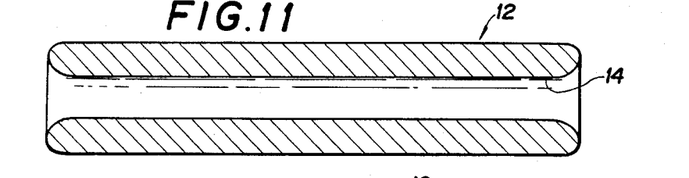
FIG. 11 is a longitudinal sectional view of one of the bearing races shown in FIG. 10.

Further, each of the loaded ball grooves 14, 15 is constituted by a groove having an arcuate cross-section of a radius of curvature which is about a half of that of the ball. The formation of the loaded ball grooves 14, 15 by such arcuate grooves permits each loaded ball $B_1$ to make contact at two points in the direction of contact even when a preload (precompression) is applied to the bearing or a load is applied thereto in any direction; therefore, the loaded balls $B_1$ perform an excellent sliding motion without causing any differential slip. Moreover, since the arcuate grooves permit the loaded balls $B_1$ to make two-point contact, even when a heavy load is applied, the balls are elastically deformed to make it possible to obtain a wide width of contact, resulting in an increase in rigidity. Furthermore, the ideal arrangement, in which the two arcuate grooves are provided with a proper angle of contact, and the structure, which permits each ball to make two-point contact, provide a space for elastic deformation of the ball. Therefore, even if the mounting surface has any error, it is absorbed inside the bearing, so that it is possible to obtain a natural, smooth motion of the bearing.

Figure 12:
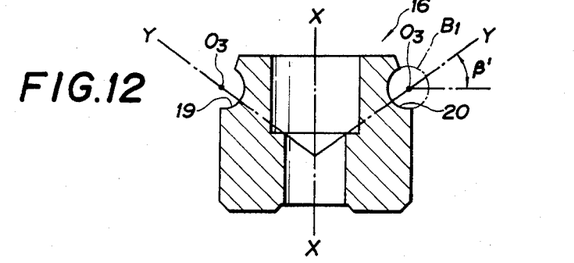
FIG. 12 is a transverse sectional view of a track shaft.
Figure 13:
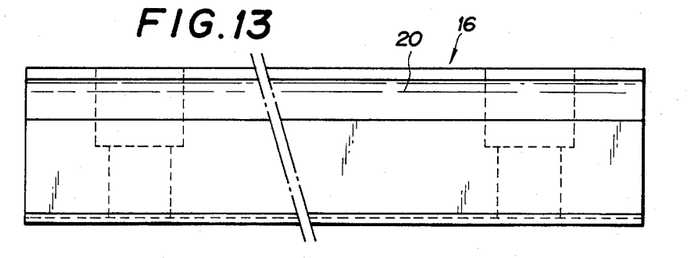
FIG. 13 is a side elevational of the track shaft.
Figure 14:
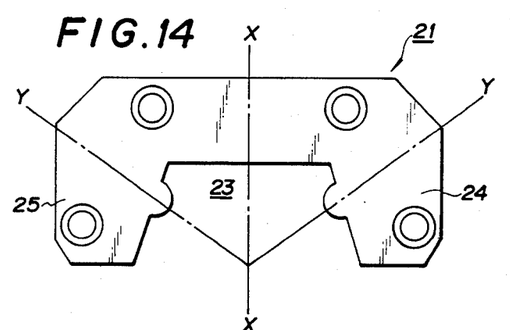
FIG. 14 is a front elevational view of the end cover, showing the outer surface thereof.

A track shaft 16 is adapted to be fitted in the central cavity 3 of the main body 1 and mounted to a movable or fixed part of a machine tool or the like by the use of fixing means such as bolts or the like. As shown in FIGS. 4, 12 and 13, the track shaft 16 has on its left and right inclined surfaces 17, 18 loaded grooves 19, 20 of semi-circular cross-section axially extending correspondingly to the loaded ball grooves 14, 15 formed in the bearing races 12, 13, respectively. The curvature center $O_3$ of each of the loaded ball grooves 19, 20 is coincident with both the curvature center $O_1$ of each of the race-receiving grooves 6, 7 and the curvature center $O_2$ of the loaded ball grooves 14, 15 formed in the bearing races 12, 13. Thus, two rows of loaded passages are defined by these loaded ball grooves 14, 15 and 19, 20. Further, similarly to the loaded ball grooves 14, 15 formed in the bearing races 12, 13, each of the loaded ball grooves 19, 20 formed in the track shaft 16 is constituted by a groove having an arcuate cross-section of a radius of curvature which is about a half of that of the ball. Moreover, similarly to the loaded ball grooves 14, 15 formed in the bearing races 12, 13, the loaded ball grooves 19, 20 formed in the track shaft 16 have a contact angle $\beta_1'$ of 45° with respect to the loaded balls $B_1$ to increase the load bearing capacity of the bearing.

Balls B, adapted to be interposed between the bearing races 12, 13 and the track shaft 15 so as to recirculate, include loaded balls $B_1$, which are bearing a load while rolling along the passages defined between the loaded ball grooves 14, 15 formed in the bearing races 12, 13 and the loaded ball grooves 19, 20 formed in the track shaft 16, respectively, and non-loaded balls $B_2$, which are rolling through the non-loaded ball passages 10, 11 formed in the main body 1. It is to be noted that the same ball B is referred to as the loaded ball $B_1$ when it is in the loaded region and as the non-loaded ball $B_2$ when it rolls along the non-loaded region.

Figure 15:
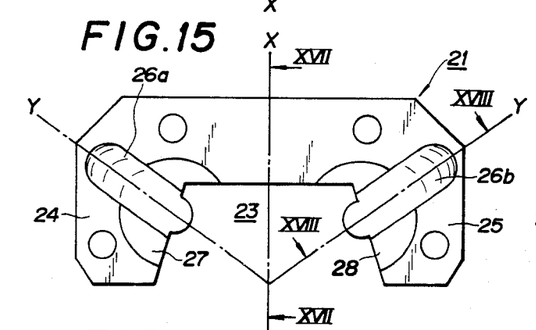
FIG. 15 is a rear view of the end cover, showing the inner surface thereof.
Figure 16:
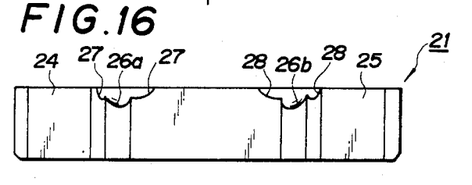
FIG. 16 is a bottom view of the end cover.
Figure 17:
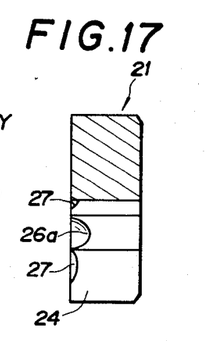
FIG. 17 is a sectional view taken along the line XVII—XVII of FIG. 15.
Figure 18:
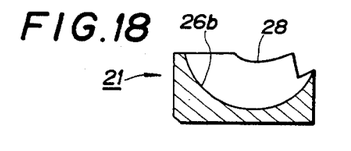
FIG. 18 is an obliquely cut sectional end view taken along the line XVIII—XVIII of FIG. 15.

Reference numerals 21, 22 denote end covers adapted to be attached to the front and rear end surfaces of the main body 1 by the use of fixing means such as bolts or the like. The end covers 21, 22 are made of a synthetic resin material by injection molding or a die casting alloy by die casting. The construction of the end covers 21, 22 will be described hereinunder through one end cover 21 with reference to FIGS. 14 to 18. The end cover 21 is constituted by a cover member of channel-like cross-section which has in its center a substantially rectangular central cavity 23 and is provided with left and right skirt portions 24, 25 interposing the central cavity 23 therebetween. Thus, the end cover 21 has an inner peripheral configuration similar to that of the main body 1. The end cover 21 further has ball turning grooves 26a, 26b formed so as to curve toward the corresponding outer surfaces of the cover member. The disposition of the ball turning grooves 26a, 26b will be explained hereinunder in more detail. As shown in FIG. 15, each of the ball turning grooves 26a, 26b is disposed on an intersection line Y—Y crossing the central line X—X of the main body 1 at an angle of about 55° and is extended by a predetermined length along the intersection line Y—Y. Thus, the starting ends of the ball turning grooves 26a, 26b correspond to one ends of the loaded passages defined by the loaded ball grooves 14, 15 formed in the bearing races 12, 13 and the loaded grooves 19, 20 formed in the track shaft 16, respectively, while the terminating ends of the ball turning grooves 26a, 26b correspond to one ends of the non-loaded ball passages 10, 11 formed in the main body 1, respectively.

To sum up, the ball turning grooves 26a, 26b have the starting ends thereof communicated with the loaded passages defined by the loaded grooves 14, 15 and 19, 20, respectively, and the terminating ends thereof communicated with the non-loaded passages 10, 11, respectively. Accordingly, the end cover 21 with the ball turning grooves 26a, 26b provides a communication between the front sides of the loaded ball passages defined by the loaded ball grooves 14, 15 and 19, 20, and the front sides of the non-loaded ball passages 10, 11, respectively. On the other hand, the other sides of the loaded ball passages defined by the loaded ball grooves 14, 15 and 19, 20 and the other sides of the non-loaded ball passages 10, 11 are communicated with each other through the other end cover 22 having the same construction as that of the end cover 21. Thus, a ball recirculating passage is completed by cooperation of a loaded ball passage defined by the loaded ball grooves 14, 19 and the non-loaded ball passage 10, for example (see FIG. 4).

The end cover 21 is further provided in its inner surface with race retainer grooves 27, 28 of semi-circular shape in plan. Each of the race retainer grooves 27, 28 has its center disposed on an intersection line Y—Y crossing the central line X—X of the main body 1 at an angle of about 55°. The race retainer grooves 27, 28 have a cross-section formed into a curved surface so as to retain the curved end portions of the bearing races 12, 13.

Figure 19:
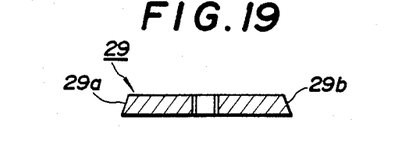
FIG. 19 is a transverse sectional front elevational view of a race-pressing member.
Figure 20:
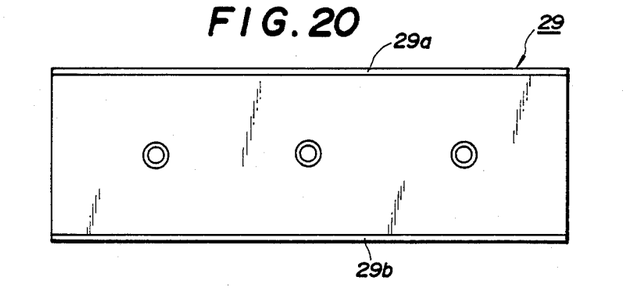
FIG. 20 is a plan view of the race-pressing member.

A reference numeral 29 denotes a race-pressing member adjustably screwed to the ceiling portion 2 of the main body 1 through fixing means such as bolts 30 or the like. The race-pressing member 29 is constituted by a wedge member formed from a plate of trapezoidal cross-section. The race-pressing member 29 is supported at three points by the bolts 30 screwed into the respective tapped holes 2a, 2b, 2c formed in the ceiling portion 2. Wedge surfaces 29a, 29b of the race-pressing member 29 are made to abut on longitudinal upper side surfaces 12a, 13a of the bearing races 12, 13 mounted within the race-receiving grooves 6, 7 formed in the main body 1. Then, the race-pressing member 29 under this state is upward pulled by means of a screwing operation. Consequently, through its wedge action, the race-pressing member 29 forcedly enters both gaps defined between the ceiling portion 2 and the longitudial upper side surfaces 12a, 13a of the bearing races 12, 13 opposing to each other, to fit into the bearing races 12, 13. As a result, the bearing races 12, 13 are pressed in their respective rotational directions by the race-pressing member 29 through the longitudinal upper side surfaces 12a, 13a. Accordingly, in FIG. 4, one bearing race 12 is pressed so as to rotate counterclockwise, while the other bearing race 13 is pressed so as to rotate clockwise, and longitudinal lower side surfaces 12b, 13b, opposite to the side surfaces 12a, 13a, abut on the stoppers 8, 10, respectively. In this case, since the curvature center $O_1$ of each of the race-receiving grooves 6, 7 is completely coincident with the curvature center $O_2$ of each of the loaded grooves 14, 15 formed in the bearing races 12, 13, respectively, there is no possibility of any desirable displacement of the curvature center $O_2$ of each of the loaded ball grooves 14, 15 formed in the bearing races 12, 13, even if there is any error in operation for mounting the bearing races 12, 13 by means of the race-pressing member 29. Thus, according to the present invention, the left and right bearing races 12, 13 can be simultaneously fixed with a high accuracy simply by manipulating a single race-pressing member 29.

The following is the description of the operation of the linear slide bearing in accordance with the invention, having the above-described construction.

A linear slide bearing unit in accordance with the invention is mounted on the track shaft 16 of a machining center (not shown), for example, and a necessary instrument or tool is set on the main body 1. Then, the bearing unit is moved back and forth, so that the loaded balls $B_1$, which are held within the loaded ball passages defined by the loaded ball grooves 14, 15 formed in the bearing races 12, 13 and the loaded ball grooves 19, 20 formed in the track shaft 16 are made to run in one direction while being guided by the loaded ball passages. In due course, the loaded balls $B_1$ are turned to change the running direction from the linear direction to the circular direction by the ball turning grooves 26a, 26b formed in the end cover 22, and are sent into the non-loaded ball passages 10, 11 to run as the non-loaded balls $B_2$. Thereafter, the non-loaded balls $B_2$ running out of the non-loaded ball passages 10, 11 are then turned to change the direction from the linear direction to the circular direction, and are returned to the loaded ball passages defined by the loaded ball grooves 14, 15 formed in the bearing races 12, 13 and the loaded ball grooves 19, 20 formed in the track shaft 16 to roll along these passages as the loaded balls $B_l$ again. Thereafter, the balls B repeat recirculation through the same movements.

In the linear slide bearing of the invention, having the above-described construction and operation, the bearing races provided with the loaded ball grooves are formed separately from the main body. Therefore, the loaded ball grooves can be easily ground and subjected to a hardening treatment such as quenching. In addition, since it is possible to attain an improvement in machining accuracy and a reliable thermosetting treatment, a smooth recirculation of the balls can be ensured over a long period of time. Further, since each bearing race is constituted by an arcuate member of semi-circular cross-section having a large torsional resistance, the bearing race is not twisted when a load is applied thereto in any direction. As a result, the contact pressures of the balls rolling along the bearing race can be maintained to be uniform; hence, it is possible to ensure a smooth recirculation of the balls.

Moreover, since the pair of right and left bearing races retained by the fixing surfaces of the end covers can be simultaneously fixed simply by adjusting a single race-presssing member, the operation for mounting the bearing races is extremely simplified as compared with the prior art in which the bearing races are individually fixed, thereby allowing a reduction in the production cost of the bearing unit as a whole. Furthermore, in the linear slide bearing of the invention, the bearing races can be completely positioned simply by being fixed at both ends thereof to corresponding fixing surfaces provided on the end covers, and the bearing race fixing operation conducted thereafter only requires the adjustment of a single race-pressing member. Therefore, variations in adjustment are made small as compared with the prior art in which it is necessary to individually adjust the screw tightening force of a plurality of independent screws. Accordingly, the mounting accuracy can be improved, and hence, the contact pressures of the balls can be maintained to be uniform, favorably. Also in this point of view, the balls can be smoothly recirculated, advantageously. On the other hand, even when an error is produced in the degree of clamping by the race-pressing member, there is no possibility of any undesirable displacement of the curvature center of the loaded ball groove, since the curvature center of each race-receiving groove and that of the loaded ball groove formed in the bearing race provided in the race-receiving groove are made coincident with each other. Accordingly, even when there is any mounting error, the contact pressures of the balls will be advantageously maintained uniform.

Although the invention has been described through specific terms, it is to be noted here that the described embodiment is not exclusive and various changes and modifications may be imparted thereto without departing from the scope of the invention which is limited solely by the appended claims.

What is claimed is:

1. A linear slide bearing comprising:
   a main body of channel-like cross-section having a ceiling portion and a pair of skirt portions defining a central cavity therebetween, each skirt portion being provided in its inner surface with a race-receiving groove of semi-circular cross-section opening to said central cavity, said race-receiving groove having a stopper projected at its lower arcuate end, each skirt portion further having a non-loaded ball passage longitudinally formed therethrough;
   a pair of right and left bearing races each in the form of an arcuate member of semi-circular cross-section mounted in each of said race-receiving grooves in said main body, said arcuate member being provided in the center of its inner surface with a loaded ball groove having a center of curvature coincident with that of said race-receiving groove;
   a race-pressing member in the form of a wedge member adjustabllly screwed to the inner surface of said main body ceiling portion, said race-pressing member having wedge surfaces adapted to be simultaneously placed into abutting engagement with one side surface of each of said bearing races for pressing said bearing races toward said stoppers;
   a track shaft adapted to be fitted in said central cavity in said main body and provided on its right and left side surfaces with loaded ball grooves each having a center of curvature coincident with that of the corresponding one of said bearing races;
   a pair of front and rear end covers secured to front and rear end surfaces of said main body, each cover having race retainer grooves for supporting one end of said bearing races, and being provided in its inner surfaces with ball turning grooves for connection between loaded ball passages, which are defined by said loaded ball grooves in said bearing races and in said track shaft, and said non-loaded ball passages, formed in said main body; and
   balls adapted to recirculate through said loaded ball passages and non-loaded ball passages connected with each other.

2. A linear slide bearing according to claim 1, wherein said main body is formed of a light-weight synthetic resin.

3. A linear slide bearing according to claim 1, wherein the angle of contact between each ball and the corresponding loaded ball groove is selected to be about 45°.

4. A linear slide bearing according to claim 3, wherein each of said loaded ball grooves comprises a groove having an arcuate cross-section.

5. A linear slide bearing according to claim 1, wherein each of said loaded ball grooves comprises a groove having an arcuate cross-section.

* * * * *